June 24, 1930.  M. O. SCHUR  1,765,776

LIQUID FLOW METER

Original Filed June 20, 1924

Inventor:
Milton O. Schur.

Patented June 24, 1930

1,765,776

UNITED STATES PATENT OFFICE

MILTON O. SCHUR, OF BERLIN, NEW HAMPSHIRE, ASSIGNOR TO BROWN COMPANY, OF BERLIN, NEW HAMPSHIRE, A CORPORATION OF MAINE

LIQUID-FLOW METER

Original application filed June 20, 1924, Serial No. 721,246. Divided and this application filed January 23, 1926. Serial No. 83,325.

This invention relates to meters for measuring the flow of liquid and is a division of the subject matter contained in my application Serial No. 721,246, filed June 20, 1924.

The meter which embodies my invention is characterized by a mass of capillaries through which the fluid to be measured is required to pass so that its action is affected by a viscosity of the fluid. It is therefore capable of being used as a viscometer. For this purpose the liquid to be tested may be supplied to the capillary at a constant or standard pressure, the rate of flow through the capillary being an inverse measure of the viscosity of the liquid.

While the meter may be used with any device in which the problem of measuring fluid flow with reference to viscoscity is encountered, the particular use for which it is designed is the measuring of the rate of flow of a liquid through a porous body, such for example, as the flow of "white water" through a mat of wood pulp fibers. In such cases, the flow of the water through the mat is affected by changes in the viscosity of the water which varies materially with the temperature. The meter is constructed in such a way as to oppose to the water flow a structure which is substantially equivalent to the capillary pores of the porous body and which duplicates the effect of changes in the viscosity of the fluid on the rate of flow therethrough, thus in effect providing an indication of the rate of flow reduced to a standard viscosity of the fluid. This type of meter is therefore found useful in connection with the mechanism described in my application Serial No. 721,246, previously referred to, by which a mat of pulp is deposited from an aqueous suspension of pulp upon a revolving cylinder mold, the water of the suspension passing through the pulp mat into the cylinder. By the use of this type of meter, variations in the temperature (and hence the viscosity) of the water are automatically compensated for.

For a more complete understanding of the construction and operation of the device, reference is made to the drawing on which, Figure 1 represents a sectional view of the device.

Figure 1:
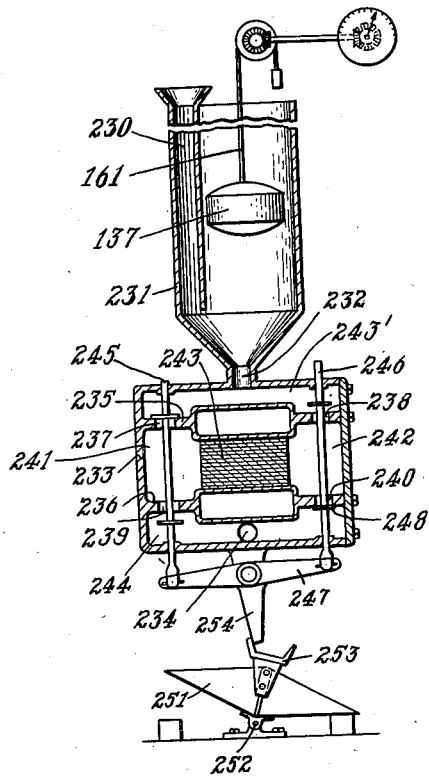
Figure 2:
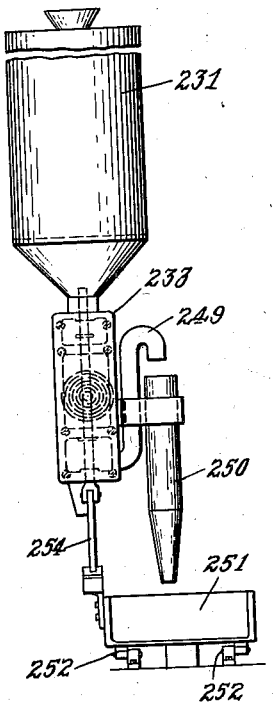
Figure 2 is an elevation of the same.

Referring in detail to the drawing, 231 represents a tank of suitable length into which the liquid is introduced as through a suitable conduit 230 which opens into the tank near the bottom thereof. A float 137 is located in the tank and attached by a flexible member 161 to any desired indicator or recording apparatus, such for example, as that indicated in Figure 1. The lower reduced end of the tank 231 is connected by a port 232 with a casing 233 having an outlet 234 near its lower end for the emission of water. This casing is horizontally divided by two partitions 235, 236. The partition 235 is provided with two ports 237, 238 and the lower partition 236 has the ports 239, 240. Within the casing between the partitions and dividing it into two chambers, 241, 242, there is a mass of defined capillaries or tubular passages of small cross section indicated at 243, through which the water may flow from one chamber to the other. The partitions 235, 236, divide the casing horizontally to form an upper chamber 243' and a lower chamber 244. Passing through each of the two pairs of ports 237, 239 and 238, 240 are the valve spindles 245, 246, which are loosely connected at their lower ends with a rocker or rocking lever 247. Each valve spindle has valves by which the ports through which it passes are alternately opened and closed, so that when one port is opened, the other is closed, and vice versa. These valves are indicated at 248. If now the water flows from the upright tank 231 into the chamber 243', with the parts in position as shown in Figure 1, it will pass through the port 238, thence through the mass of capillaries 243 and out through the port 239 to the chamber 244, from which it will be discharged through the port 234. The port 234, however, has connected therewith an upright pipe 249 having a U-bend at its upper end from which water is discharged into a vertical funnel 250. The column of liquid in the pipe 249 serves to keep the chambers 241, 242, 244, full of liquid at all times and to provide a small back pressure on the liquid flowing from the discharge ends of the capillaries to compensate for the difference of head on the liquid entering the capillaries due to the arrangement of the capillaries by which some are above others. Thus the difference of pressure at the intake and discharge ends of any one capillary is the same as that for any other. Below the funnel 250 so as to receive water discharged therefrom, there is a tilting bucket 251 divided by a central partition into two compartments. This bucket is pivoted at 252 on a suitable support. It is provided with a yoke or fork 253, the fingers of which are adapted to engage a depending arm 254 on the rocker 247. Assuming that the parts are in position shown in Figure 1 and that water is flowing therethrough as previously described, as soon as sufficient water is delivered to the left hand compartment of the bucket, the latter will be tilted to the left, and the fork 253 engaging the arm 254 with the momentum acquired during its movement, will rock the rocker 247 and shift the valve stems 245, 246 so as to open the ports 237, 240 and close the ports 238, 239 so that the water will be caused to flow through the mass of capillaries in the opposite direction, until the bucket is again tilted with a consequent reversal of operation of the valve stems and their valves.

Figure 3:
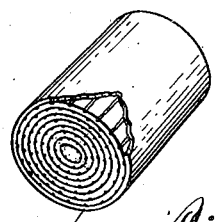
Figure 3 is a perspective of a cluster of capillaries used in the meter.

Any convenient method may be practiced in forming the mass of capillaries indicated conventionally at 243. For example, one may employ a plurality of thin tubes, indicated conventionally at 254' in Figure 3, fitting one inside the other, the exterior surfaces of each of the tubes except the outer tube being provided with fine longitudinal grooves or scratches, which constitute distinct, separate capillaries of substantially uniform cross section. When these tubes are nested together over a core which may be grooved, if desired, as shown in Figure 3, they may be inserted in a cylindrical aperture formed in the casing between the chambers 241 and 242. Of course, the outer tube of the nest of tubes may likewise be provided with fine longitudinal grooves to form capillaries between it and the enclosing wall within the casing 233. If preferred, the tubes may be scratched on their inner surfaces or on both inner and outer.

From the description herein given, it will be evident that the head of water in the tube 231 depends not only upon the rate of flow of white water from the cylinder mold, but also upon the viscosity of the water. The warmer the water and hence the lower the viscosity, the more rapid will be the rate of flow through the meter for a given hydraulic head in the tube 231. This increase in rate of flow due to the decreased viscosity of the water compensates for the increased rate of flow of the aqueous component of the pulp suspension through the fiber mat on the cylinder mold. The head of water in the tube 231 consequently represents the rate of flow of water through the pulp mat in reference to a predetermined standard viscosity of the water. Consequently the effect of temperature of the pulp suspension as affecting the rate of flow of the white water is automatically eliminated. It will further be noted that the greater the rate of flow of water through the capillaries, the greater the rate at which the bucket is tilted and consequently the more frequently is the direction of the flow of water through the capillaries changed to ensure a cleaning action.

It is evident that many changes or modifications of form and structure may be made without departing from the spirit and scope of the invention as defined by the claims.

I claim:

1. In a device of the class described, a member formed with a defined capillary, means for causing liquid to flow therethrough, and means for periodically reversing the direction of flow.

2. In a device of the class described, a member formed with a cluster of capillaries, means for causing liquid to flow therethrough, and means actuable by the liquid for periodically reversing the direction of flow therein.

3. In a device of the class described, a member formed with a cluster of capillaries, means for causing liquid to flow therethrough, and means actuable by the liquid for successively reversing the direction of flow therein upon the passage of predetermined quantities of liquid therethrough.

4. In a device of the class described, a member formed with a cluster of capillaries extending therethrough, a liquid receptacle having an outlet communicating with said capillaries and an inlet through which liquid may be supplied, and means for indicating the pressure on the liquid entering said capillaries.

5. In a device of the class described, a member formed with a plurality of capillaries having their intake ends at different levels, and means for maintaining an equal difference of liquid pressure at the intake and discharge ends of all the said capillaries, whereby liquid is caused to flow therethrough.

6. In a device of the class described, a member formed with a cluster of capillaries extending horizontally therethrough, means for causing liquid to pass through said capillaries, means for maintaining an equal pressure difference at the intake and discharge ends of all the said capillaries, and means for periodically reversing the direction of flow of the liquid through the capillaries.

7. In a device of the class described, a member formed with a cluster of capillaries, said member being composed of elements comprising a cylindrical core and a series of closely fitted concentric tubes, certain of said elements having longitudinal scratches thereon from end to end.

8. In a device of the class described, a member formed with a cluster of parallel capillaries, said member comprising a cylindrical core member having uniform longitudinal grooves of capillary size on its surface, and concentric tubes having uniform longitudinal grooves of capillary size in their outer surfaces closely fitted successively over said core.

9. A meter for measuring the flow of a liquid, comprising a member formed with a capillary therethrough, means for causing the liquid to flow through the capillary, means for indicating the rate of flow reduced to a standard viscosity of the liquid, and means for preventing clogging of the capillary.

10. In a liquid flow meter, a member having a cluster of capillaries formed therein, means for supplying liquid to said capillaries under pressure to maintain a flow therethrough, and means for indicating the pressure of the liquid entering the capillaries.

11. The method of determining the rate of flow a liquid of standard viscosity would have under a predetermined constant head and through a body of variable porosity, which comprises forcing through said body under said head a working liquid which may vary from standard vescosity, and thereupon forcing the working liquid as it comes from said body through a second body of fixed porosity, the rates of flow through the two bodies being kept equal, and measuring the pressure required to maintain the flow through the second body.

In testimony whereof I have affixed my signature.

MILTON O. SCHUR.